United States Patent
Brunson et al.

(10) Patent No.: US 9,398,055 B2
(45) Date of Patent: Jul. 19, 2016

(54) SECURE CALL INDICATOR MECHANISM FOR ENTERPRISE NETWORKS

(71) Applicant: Avaya Inc., Basking Ridge, NJ (US)

(72) Inventors: Gordon R. Brunson, Broomfield, CO (US); Rifaat Shekh-Yusef, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 256 days.

(21) Appl. No.: 13/631,123

(22) Filed: Sep. 28, 2012

(65) Prior Publication Data

US 2014/0096198 A1    Apr. 3, 2014

(51) Int. Cl.
*G06F 7/04* (2006.01)
*H04L 29/06* (2006.01)

(52) U.S. Cl.
CPC ........ *H04L 65/1063* (2013.01); *H04L 63/0281* (2013.01); *H04L 63/1408* (2013.01); *H04L 63/1433* (2013.01); *H04L 65/103* (2013.01); *H04L 65/104* (2013.01); *H04L 65/1006* (2013.01); *H04L 65/1069* (2013.01)

(58) Field of Classification Search
CPC ............ H04L 65/1063; H04L 65/1069; H04L 65/104; H04L 65/103; H04L 65/1408; H04L 65/1006; H04L 63/0281; H04L 63/1433
See application file for complete search history.

(56) References Cited

U.S. PATENT DOCUMENTS

| | | | |
|---|---|---|---|
| 8,166,293 B2 | 4/2012 | Masuhiro et al. | |
| 2004/0123095 A1* | 6/2004 | Marshall | 713/153 |
| 2008/0028204 A1* | 1/2008 | Masuhiro et al. | 713/152 |
| 2008/0120697 A1* | 5/2008 | Beyer et al. | 726/4 |
| 2009/0013380 A1* | 1/2009 | Chandrasiri et al. | 726/3 |
| 2009/0313698 A1* | 12/2009 | Wahl | 726/22 |
| 2012/0155396 A1* | 6/2012 | Gammon | 370/329 |
| 2012/0240201 A1* | 9/2012 | Ramaswamy et al. | 726/4 |
| 2013/0173812 A1 | 7/2013 | Ezell et al. | |
| 2014/0133362 A1* | 5/2014 | Forsberg et al. | 370/259 |

FOREIGN PATENT DOCUMENTS

EP    1921792 A1    5/2008

OTHER PUBLICATIONS

Phone Security Overview, http://www.cisco.com/en/US/docs/voice_ip_comm/cucm/security/8_0_2/secugd/secuphne.html.
U.S. Appl. No. 13/485,604, SIP Transfer in a Back-To-Back User Agent (B2BUA) Environment, 4366YDT-101, this application has not yet published, so it will not be included here.
Secure Voice on Cisco Integrated Services Routers, http://www.cisco.com/en/US/prod/collateral/routers/ps259/product_data_sheet0900aecd8016c784_ps5855_Products_Data_Sheet.html.
IETF, Network Working Group, RFC 3711, The Secure Real-time Transport Protocol (SRTP), http://tools.ietf.org/pdf/rfc3711.pdf.

* cited by examiner

*Primary Examiner* — Nirav B Patel
*Assistant Examiner* — Mohammed Waliullah
(74) *Attorney, Agent, or Firm* — Sheridan Ross P.C.

(57) ABSTRACT

The concept of a secure call indicator is introduced. In general, the secure call indicator is capable of inspecting the security of signaling associated with Session Initiation Protocol (SIP) messages and comparing the security with media descriptions of the actual media path of the SIP messages. Furthermore, the secure call indicator may be configured to indicate the security associated with a communication session via a physical or virtual notification system.

21 Claims, 5 Drawing Sheets

SECURE CALL INDICATOR MECHANISM FOR ENTERPRISE NETWORKS

FIELD OF THE DISCLOSURE

The disclosure relates generally to communications and specifically Session Initiation Protocol communications.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Voice over Internet Protocol (VoIP) is a general term for a family of transmission technologies used to deliver voice communications over IP networks such as the Internet or other packet-switched networks. Other terms frequently encountered and synonymous with VoIP are IP telephony, Internet telephony, voice over broadband (VoBB), broadband telephony, and broadband phone.

VoIP systems employ session control protocols, such as SIP, to control the set-up and tear-down of calls as well as audio codecs which encode speech allowing transmission over an IP network as digital audio via an audio stream. The advantage to VoIP is that a single network can be utilized to transmit data packets as well as voice and video packets between users, thereby greatly simplifying communications.

Security is critical to the reliable and protected exchange of information when communicating over IP networks. In a VoIP network, signaling and media security is established hop-by-hop on both the signaling plane and on the media plane. Although it is possible to establish end-to-end secure calls, when the call traverses non-VoIP paths or egresses outside the enterprise administrative domain, it is not apparent whether the hop-by-hop security policies of the enterprise have been maintained. Thus, the participants of the call cannot be sure that their conversation is secure.

SUMMARY

It is, therefore, one aspect of the present disclosure to provide the concept of a secure call indicator mechanism and method to address the aforementioned shortcomings. Among other things, the secure call indicator mechanism may be used to determine and indicate whether a communication session is secure or unsecure. In one embodiment, the secure call indicator may appear as a virtual or physical indication light that illuminates when the communication session is determined to be secure. At any time, if the communication session is deemed to be unsecure by the secure call indicator mechanism, the indication light may be deactivated. As can be appreciated, the functionality and/or behavior of the indication light may be reversed to indicate a security or lack of security associated with the communication session. For instance, an unsecure communication session may be indicated by an illuminated light. In this case, if the communication session is deemed to be secure by the secure call indicator mechanism, the indication light may be deactivated.

It is anticipated that several security criteria/conditions may be provisioned by the secure call indicator mechanism to ensure that a communication session is secure. These security conditions may include but are in no way limited to detecting management of a call by a trusted communication server or session manager, use of Transport Layer Security ("TLS") signaling links, Secure Session Initiation Protocol ("SIPS') protocol for communication requests, Datagram Transport Layer Security ("DTLS") communications, tamper-protected headers to detect unauthorized changes to endpoint-view-parameter and SDP content, use of secure transport protocols such as Secure Real-Time Protocol ("SRTP"), and combinations thereof. Examples of endpoint-view parameters can be found in copending U.S. application Ser. No. 13/485,604, the entire contents of which are hereby incorporated herein by reference for all that they teach and for all purposes. Moreover, the invention may be used in direct-media calls within an enterprise network where a common administrative policy has been enforced.

One aspect of the present disclosure allows the inspection of secure signaling beyond point-to-point media topologies. For instance, the mechanism may be extended to include additional detection criteria/conditions involving managed tamper-protected Secure-Media Headers. These headers may be used to validate secure media handling by intermediate modules. In other words, a direct-media restriction may be expanded to include all topologies of enterprise managed calls including conference calls.

In some embodiments, the detection and indication of a secure conference call may involve the participation of a media server that is performing conference focus functions. For example, additional or alternate, criteria may be used for scenarios where an endpoint-view-parameter is not available. The mechanism may determine that a secure RTP stream has been established with a conference focus. In addition, a proprietary extension may be attached to the conference event that indicates each leg of the conference has passed a security test, the test involving several security conditions/criteria.

It is another aspect of the present invention to allow for secure call indication through intervening media servers. In some embodiments, this indication may involve inspecting the functionality of the media server itself. This inspection may be a design code inspection performed beforehand to determine if the media server is trustworthy. The media server may be capable of being secured for all call types, in which case it will appear in a list of "Securable-Media Entities". Additionally it may at times modify its Secure-Media behavior and declare the call insecure by updating the "Secure-Media Header" if any business feature places it in a topology where security cannot be guaranteed. A communication server, may validate these headers as the call is managed and convey a final indication of end-to-end media path security to the endpoints which then are responsible for rendering an appropriate indicator.

The terms "application server" and "media server" are used interchangeably herein, and in some cases may be represented by the term "application/media server."

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
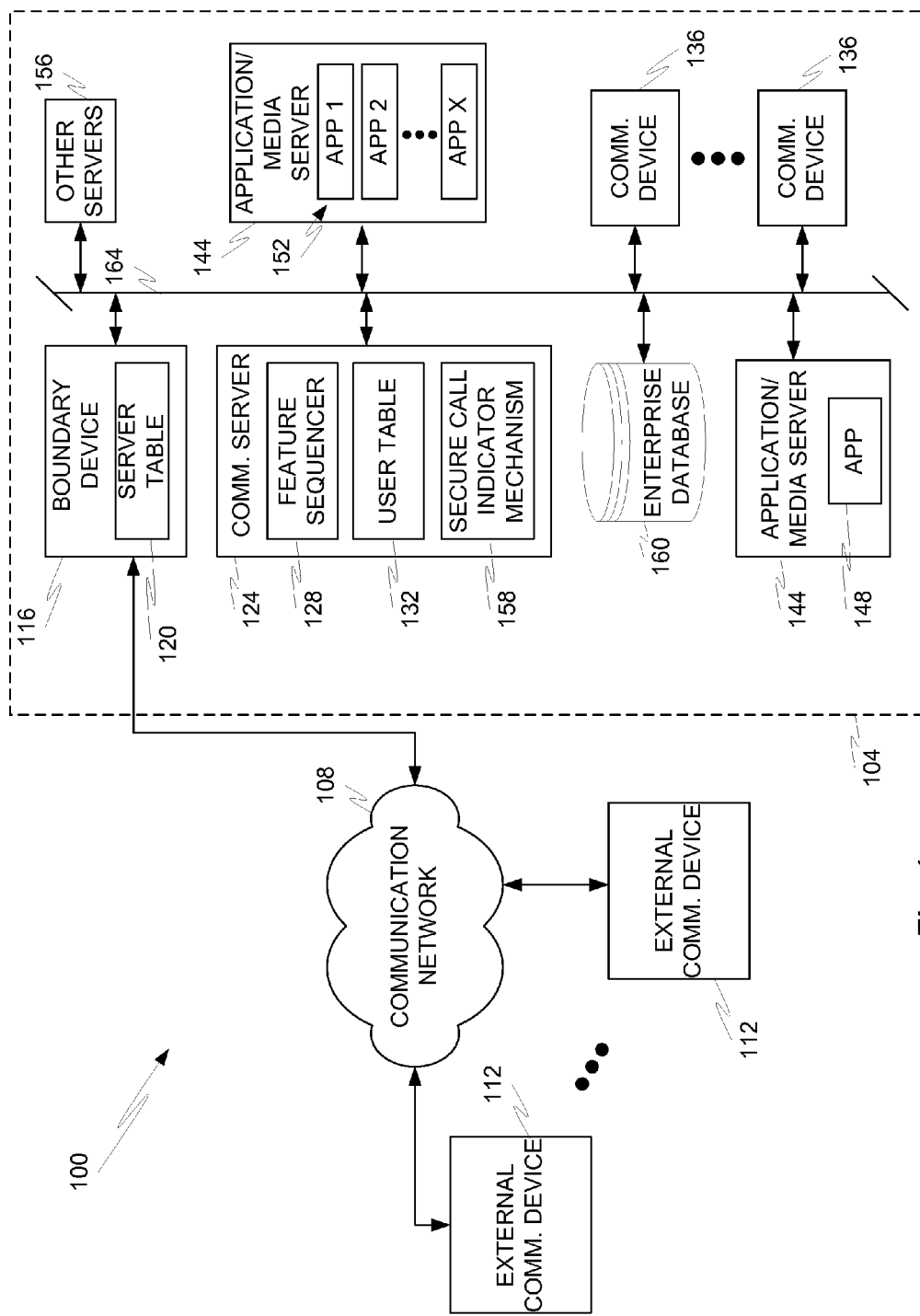
FIG. 1 is block diagram depicting a communication system in accordance with embodiments of the present disclosure.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or coresident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108, in a Session Border Controller or similar device.

The communications server 124 can include a Private Branch eXchange (PBX), an enterprise switch, an enterprise server, combinations thereof, or other type of telecommunications system switch or server. The communications server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user. This is one reason why the network boundary device 116 may be provided with a server table 120.

Additionally, multiple servers 124 can support a common user community. For example, in geo-redundant and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 may include a feature sequencer 128, a user table 132, and a secure call indicator mechanism 158. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session. The secure call indicator mechanism 158 may determine a level of security associated with a communication session as disclosed herein.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only two application, or media, servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

The other servers 156 may comprise email servers, voicemail servers, calendaring servers, conferencing servers, and other types of servers known to provide particular services to client devices. In some embodiments, the other servers 156 may also be considered application servers 144, which provide one or more applications for use in a communication session.

The internal communication devices 136 can be similar or identical to the external communication devices 112, except they are provisioned, and often owned, by the enterprise. Exemplary types of communication devices 112 include, without limitation, any capable phone, hardphone, softphone and/or digital telephone. Examples of suitable telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 160 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

The various servers and components depicted in FIG. 1 may be implemented separately (i.e., on different servers) or together (i.e., on a single server). In particular, two or more depicted components (e.g., communications server 124 and secure call indicator mechanism 158) may be implemented on a single server without departing from the scope of the present invention. Thus, a single device may provide the functionality of several components depicted separately in FIG. 1. As another example, the boundary device 116 and communication server 124 may be implemented on a single device. As yet another example, the secure call indicator mechanism 158, feature sequencer 128, and/or application server 144 may be implemented on a single server. Alternatively or additionally, the functionality of single devices may be implemented on different servers. For example, the feature sequencer 128 and the secure call indicator mechanism 158 may be implemented on different devices.

Figure 2:
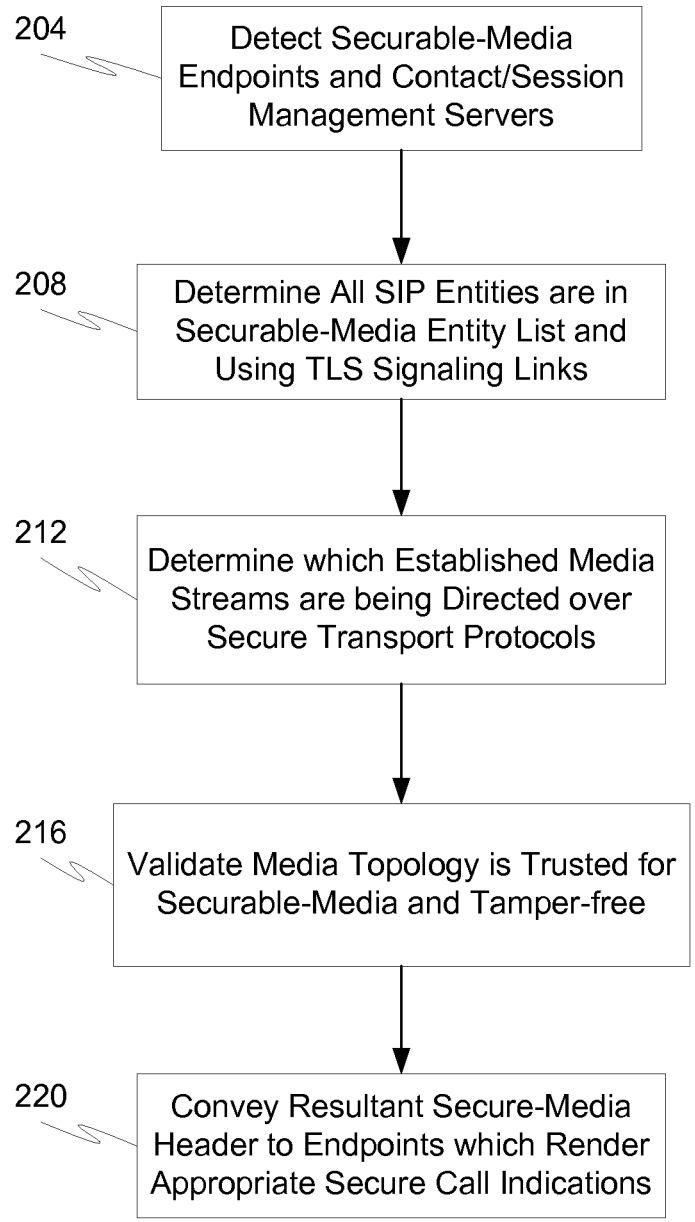
FIG. 2 is a flow diagram depicting a method of determining to indicate a secure communication session in accordance with embodiments of the present disclosure.

Referring now to FIG. 2, a flow diagram depicting a method of determining to indicate a secure communication session is shown in accordance with embodiments of the present disclosure. In general, the method utilizes one or more security criteria/conditions to determine a security associated with a communication session. It is one aspect of the present disclosure to allow security criteria/conditions to be customized in determining the security of a communication session. For example, the security of a communication session may be determined at varying levels ranging from zero security to strict security, which may also include one or more intermediate levels of varying security ratings. In some embodiments, the customization of security criteria/conditions that must be passed to indicate a secure call may be set by administrative policy. This policy may be located in a single location or in a number of locations.

In some embodiments, it may be the policy of a first enterprise to only indicate a call as secure when it has been determined that the security of the call has passed all of a number of security criteria/conditions and/or one or more strict security criteria/conditions. On the other hand, a second enterprise may indicate that a call is secure upon determining that a lesser number of security criteria/conditions are satisfied that may not include all of the criteria. It is anticipated that the indication of a secure call may be presented to a user to in a manner that may suggest the level of security associated with the call. For instance, the secure indicator at an endpoint, whether physical or virtual, could display and/or behave differently to indicate various levels of security. In one embodiment, a call determined to be "very secure" may direct the illumination of a light to display at a specific brightness (e.g., high brightness) or state (e.g., solid illumination). In another embodiment, a call may be determined to be "secure" and as such the illumination of a light may be directed to display at a lower brightness and/or state (e.g., by flashing the illumination of the indicator light). It is anticipated that the indication of a secure call may be achieved through any means designed to convey information including but not limited to at least one character, text, photo, video, icon, avatar, light emission, tactile feedback, audible alarm, combinations thereof, and the like.

The method begins at step 204, by mutually detecting securable-media endpoints and session management servers. This step may be performed in part by the secure call indicator mechanism 158, at least one endpoint in a communication session, and/or at least one other endpoint or SIP entity. In some embodiments, trust of session management may be determined at the endpoint by, among other things, comparing the identification of the communication server 124 managing a communication session with a stored secure domain policy document. Trust of endpoints by session management may be determined by comparing the endpoint type against a list of validated endpoint types for the domain. Trust of secure-media applications and other SIP entities by session management may be determined by matching the SIP entity against a provisioned "Securable-Media Entity" list. In other embodiments, trust may be determined by inspecting certificate attributes or other trusted attributes associated with the communication server 124, endpoints 136, 112 and/or with a server-handled message. In some embodiments, the method may proceed upon determining that the communication server is trusted for securable media. It is anticipated that the method may be terminated upon detecting that the communication server managing the communication session is untrusted and/or not found on the stored "trusted" identification.

However, it is not necessary that a communication server be trusted or untrusted to continue with or terminate the method. For example, a secure call indicator mechanism 158 may be directed by policy that determines which action is appropriate upon the satisfaction and/or failure of any security criterion/condition. In such cases, the enterprise policy may control secure call indication determinations and override default settings associated with the secure call indicator mechanism 158.

The method continues at step 208 by determining all of the SIP entities in the communication session are in the Securable-Media Entity list, and are using TLS signaling links with an appropriate level of encryption. For example, a null cipher may not be secure, even though the link may be TLS. It is an aspect of the present disclosure to inspect the signaling links for a possible lack of security. Signaling links that are not protected may result in information loss, interference, disruption, and even theft. The links may be protected via encryption, challenge/response mechanisms, and the like. Encryption may be determined if the signaling links utilize TLS cryptographic protocols. In other words, ensuring the use of TLS secured signaling links may be used as a security criterion/condition by the secure call indicator mechanism 158.

Step 212 describes inspecting each established media stream to determine if it is suitably encrypted using an appropriate transport protocol such as SRTP for audio and video streams, TLS for block text, DTLS, etc. In some embodiments, any stream which lacks suitable encryption at any point can be marked insecure. The inspection may be done by parsing the negotiated SDP. In one embodiment, the inspection may be performed for every SIP dialog that is part of creating the end-to-end call session. If a media stream is insecure at any segment of the end-to-end path, the entire path of that media stream may be marked insecure.

The method may continue at step 216, where the media path topology may be inspected to ensure that all entities handling the media as indicated by the negotiated SDP are in the Securable-Media Entity list or are endpoints of a securable-media type, and that the signaling has been tamper-free from a securable-media perspective. The overall operation of this step may be advantageously subdivided into sub-steps performed at each pass of dialog-creating INVITE processing through the session management server when establishing the end-to-end call session. The first time a dialog-creating INVITE is received by session management, a Secure-Media Header may be added to the message. The contents of the header includes a fingerprint of the hashed values of the endpoint-view header, the SDP body, the current partial results of the secure-media markings. The hash mechanism may be known only to the session manager and may not be shared with any other network element. Each time the INVITE message returns to session management as it establishes it end-to-end path, the Secure-Media Header may be checked to determine if anything has been changed without permission. If an unauthorized change has occurred, the media may be marked insecure. In some embodiments, the Secure-Media Header may be replaced by the latest secure-media calculation prior to routing the INVITE to the next SIP entity.

Once the secure call indicator mechanism 158 has performed all of the appropriate security criteria/conditions, the method may continue at step 220 by interpreting the final secure-media calculation result in the Secure Media Header at the endpoints. In one embodiment, it may be the responsibility of a securable-media endpoint to verify that the signaling came from the trusted session management server before creating an appropriate indication suitable for its user interface.

As previously stated, this secure call indication may be made according to policy and/or in response to satisfying one or more of the security criteria/conditions recited above. In one embodiment, the secure call indicator mechanism 158 may be configured to indicate a communication session as "secure" after all of the security criteria/conditions are passed as "secure." Another embodiment may elect to indicate on a per-media stream basis which streams are secure and which are not. The indication of a secure call may be made at one or more endpoints by informing a user of the secure call. For example, at least one state of illumination associated with a secure call indication light may be controlled after the call is determined to be secure.

Figure 3:
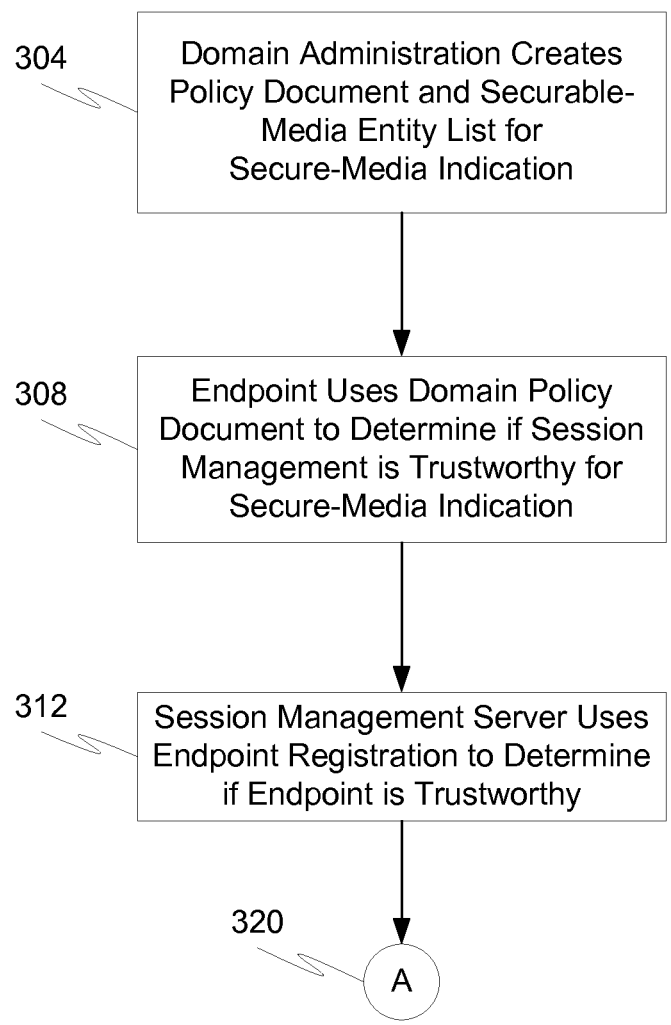
FIG. 3 is a flow diagram depicting a method of determining communication session management by a trusted communication server in an administrative domain in accordance with embodiments of the present disclosure.
Figure 4:
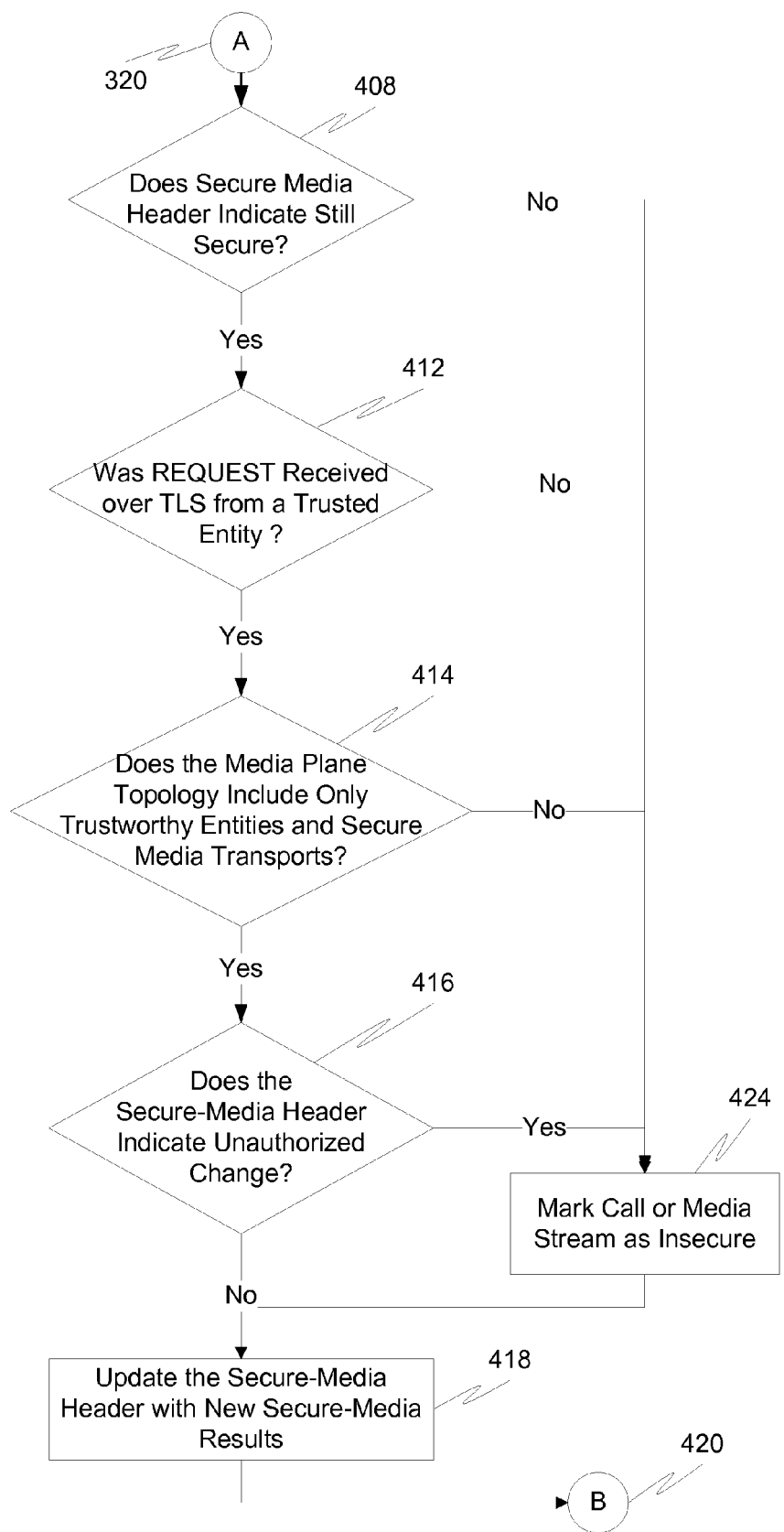
FIG. 4 is a flow diagram depicting a method of determining individual media stream security in accordance with embodiments of the present disclosure.
Figure 5:
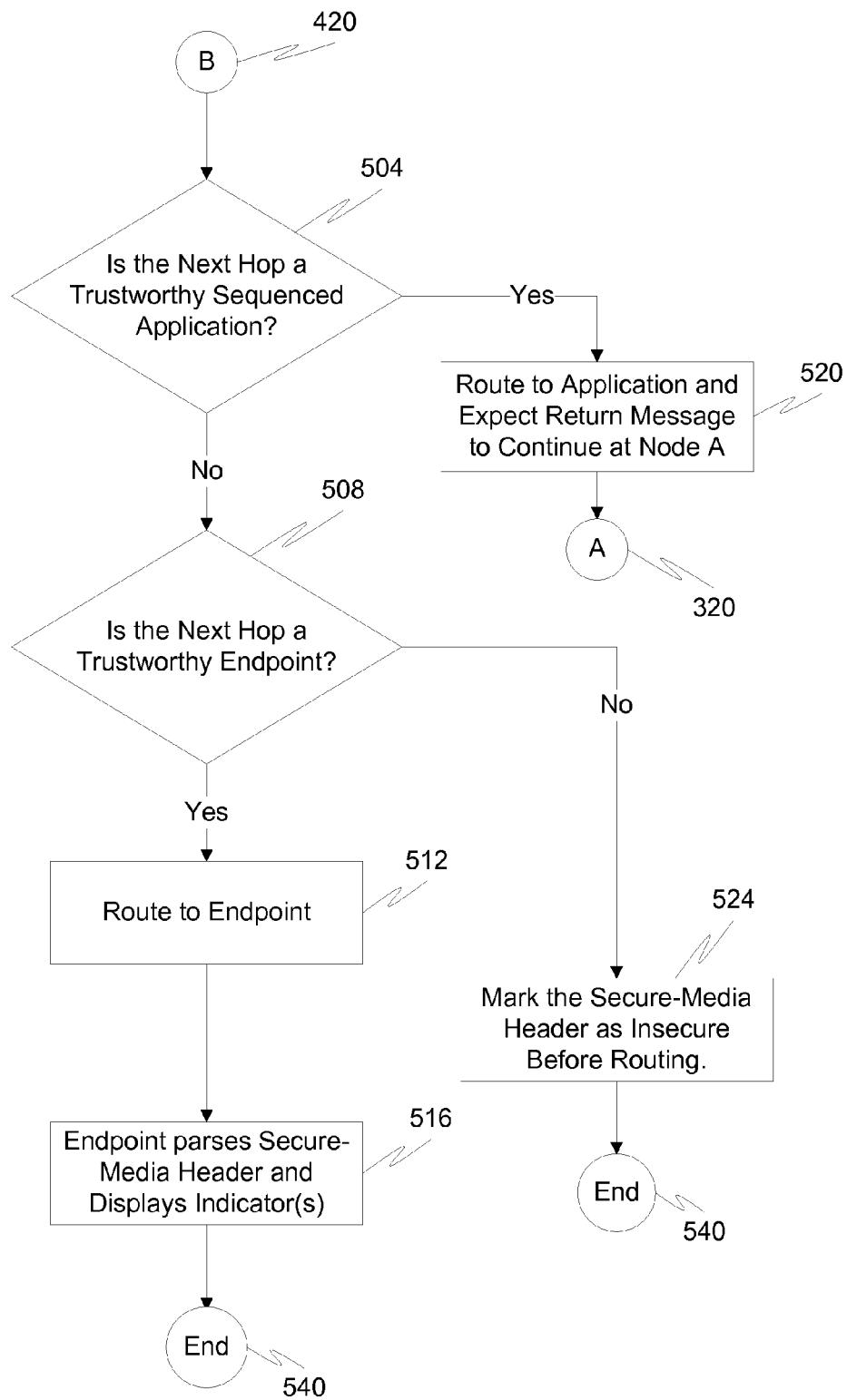
FIG. 5 is a flow diagram depicting a method of determining secure-media header routing and indicator rendering by endpoints in accordance with embodiments of the present disclosure.

FIGS. 3-5 depict further detail in determining the media security associated with a communication session in accordance with embodiments of the present disclosure. In an exemplary embodiment, the multiple methods shown in FIGS. 3-5 may be combined, in any order, to form a single method in determining the security associated with a communication session. In some embodiments, one or more methods represented in FIGS. 3-5 may be practiced alone, and/or together with at least one other method, in determining a security associated with a communication session.

FIG. 3 shows a flow diagram depicting a method of determining communication session management by a trusted communication server in accordance with embodiments of the present disclosure. As previously stated, some embodiments determine trust by, among other things, comparing the identification of the communication server managing a communication session with a stored "trusted" communication server identification. The method begins at step 304 when a domain administrator provisions the settings and policies for secure-media indication for the network. Endpoint types which have been validated to correctly support the feature are entered into a list of trustworthy endpoint types. Session management servers which have been validated to correctly support the feature are entered in the policy document retrieved by endpoints. The SIP entities already provisioned in the network are given attributes indicating which ones are secure-media trustworthy and which ones are allowed to modify SDP and endpoint-view header contents. Assigning these attributes effectively create the securable-media entity list.

The method continues at the endpoint by determining the identity of the managing communication server associated with the communication session and message (step 308). The endpoint may be assigned several session management servers for purposes of redundancy. In one embodiment, secure-media indication may only be supported when the particular session management server used to set up the call has been provisioned as trustworthy in step 304. In some embodiments, the identity of the session management server may be determined by hostname or IP address assigned to the endpoint as the outbound proxy, or preferably by validating the server certificate offered to the endpoint during the initial connection establishment with the session management server. The identity may be checked against the information contained in the Domain policy document obtained by the endpoint during the endpoint's initialization and configuration operations.

The method continues with step 312 where the session management server determines if a particular endpoint is trustworthy for the secure-media indication feature. The session management server may make this determination when the endpoint first registers, or alternatively by inspecting the message request to determine the endpoint type. The domain policy may be used to consider any endpoint type as trustworthy, or to constrain the endpoint type to certain SIP UA types, and/or endpoints which offer a device certificate with a particular validated attribute. It is anticipated that the trustworthy status of endpoints may be stored in memory. The memory may be located remotely and/or locally. In an exemplary embodiment, the trustworthy status of endpoints may be stored in a database or list such as the SIP location server database which can be a component of the session management server.

It is an aspect of the present disclosure that the trustworthy status of endpoints, applications, and entities stored in memory may be determined based at least on prior inspection and/or policy. For instance, an enterprise policy may direct that all servers within an enterprise, or originating from a given IP address or presenting a particular certificate type, may be considered trustworthy for secure media indication. In this case, when any entity receives a SIP message from a device within that same enterprise it can perform the domain policy checks to determine the trustworthy status of the device sending the message. Additionally or alternatively, an entity may receive a SIP message from a server where at least a level of trust for that server has previously been established by prior communication/inspection. This stored level of trust, previously associated with a specific server, may be programmed to expire after some time, request renewal of trust credentials, and/or be subject to administrative policies.

It is anticipated that the memory storing the trustworthy status may also store untrustworthy status. Similar to the trustworthy server determination, the untrustworthy entities may be determined by prior inspection and/or policy. It is an aspect of the present disclosure that a previously trusted server may become an untrusted server. This transition from trusted to untrusted may occur after the expiration of trust credentials, failed renewal of trust credential, and/or as a result of administrative action.

Referring to FIG. 4, a flow diagram depicting a method of determining secure signaling of a communication session in accordance with embodiments of the present disclosure is shown. The method begins, at step 320, when an INVITE message or a SIP response message is received for processing. As can be appreciated, the message may be received before or after the message has been subjected to other secure signaling determination methods as disclosed herein. It is important to realize that the flow diagrams of FIGS. 4 and 5 are meant to apply to both SIP Request processing and SIP Response processing as either one may contain the essential SDP, endpoint-view header and Secure-Media header information upon which the mechanism depends. Secure media indication may be provided for media streams negotiated in either direction.

In some embodiments, the headers of the INVITE message may be examined to determine if a secure-media header has already been created for this session, and if the header contents indicate that the call and individual media streams are still secure (step 408). If secure-media indication is already not possible, then the call can again be marked insecure at step 424. In some embodiments, processing may continue at step 418 where the secure-media header may be updated anew. If however there is still an opportunity for at least some secure media, processing may continue at step 412.

Step 412 verifies that the SIP Signaling was received over a secured TLS link from a trustworthy entity. In some embodiments, the cipher suite for the TLS link may be associated with a specific level of encryption. When the specific level of encryption matches an appropriate encryption as determined by the domain policy, the TLS link may be considered trustworthy or adequate. It should be appreciated that a null cipher associated with the TLS link may be treated as inadequate. In some embodiments it may be adequate to inspect the URI scheme for the use of "SIPS". Alternatively the SIP transport protocol may be inspected directly so that either SIP or SIPS URI schemes may potentially yield secure media indications when all policy conditions are met.

Ideally, the identity of the sender may be determined by validating a certificate offered during the initial connection request and checking an attribute of the certificate against information or policy stored in the Securable-Media Entity list. Additionally, or alternatively, the identity may be determined by checking hostname or IP address against information stored in the list. In some embodiments, if the SIP connection is not over TLS, then the entire call may be marked insecure at step 424 and no further checks may be needed.

If the SIP connection is over an encrypted TLS link, the method may continue by determining the security associated with each media stream (step 414). In some embodiments, the security may be determined when each media stream is directed to a trustworthy entity via a secure protocol. For example, an audio or video media stream may be directed via SRTP, as described in RFC 3711, which is hereby incorporated herein by reference in its entirety for all that it teaches and for all purposes. A block text media stream may be directed over TLS. Embodiments of the present disclosure anticipate determining that the source and sink of each media stream are found as trustworthy of secure media indication. This determination may be made by parsing the SDP for the addresses of the media entities and then determining that these entities are securable-media endpoint types and/or servers listed in the Secure-Media Entity list.

If it is determined that a media stream is directed via an insecure transport or to an un-trustworthy entity the method may mark that media stream as insecure at step 424. Otherwise, the method may proceed with the next set of checks at step 416. The most detailed checks may be performed at step 416 by further examination of the Secure-Media header in relation to the SIP message structure. As mentioned previously, the Secure-Media header includes a fingerprint of the hashed value of the endpoint-view header, the hashed value of the SDP body, and the current partial results of the secure-media markings per media stream. Since this header is recalculated just prior to sending the INVITE request to each next sequenced application, the returning INVITE request from the sequenced application may be tested to determine if there were any unauthorized changes to the secure media topology. Similar arguments may be made for response processing although the next-hop may be determined by the SIP via headers. Some applications, by policy, may be allowed to change certain elements fingerprinted in the Secure-Media header. Since the SDP contains the IP addresses of the source and sink of each media stream, any attempt to change these addresses to a potentially unsafe or insecure entity can be detected. The endpoint-view header contains the endpoint device identity and SIP dialog identifiers for the signaling that controls the creation of the secure streams, any attempt to change the endpoint device or its SIP dialogs may be detected as a potentially unsafe, insecure, or unwelcome participant in the call. If any unauthorized change is detected, the media stream (or streams) affected may be marked insecure. These insecure stream indications are aggregated with the previously marked insecure streams as indicated in the Secure-Media header.

A SIP entity may also, of its own volition request any or all of the media streams to be marked as insecure by including a separate Secure-Media Marking Header in its SIP message. This allows an application to participate in determining when a business feature has been applied that would violate the domain secure-media policies. In some embodiments, SIP entities may not promote an insecure media stream back to secure using this mechanism. Such an attempt may be seen as an unauthorized change resulting in the stream being marked insecure.

It will be apparent to one skilled in the art that step 416 may iterate through all checks on all media streams and some streams may result in marking insecure in step 424, while other streams remain secure when the results of steps 408, 412, 414, and 416 may be used to update the Secure-Media header in step 418.

FIG. 5 shows how secure-media headers are adjusted by the next-hop routing decisions and where in the process the secure-media indicator is rendering by endpoints in accordance with embodiments of the present disclosure.

The checks of FIGS. 4 and 5 may proceed on a hop-by-hop basis as the session is established until it reaches the far endpoint. The session management server concludes each processing step with a route to the next hop. When the next hop is determined to be a trustworthy sequenced application at step 504, the Secure-Media header will accompany the routed message at step 520. Further handling of the session will continue with the return message expected at step 320.

When the next hop is determined to be a trustworthy endpoint at step 508, the Secure-Media header will accompany the routed message at step 512. When this message is received by the endpoint, it validates the sending entity as being a trustworthy session management server then parses the Secure-Media header for the security status of each media stream and renders the appropriate indicators at step 516.

Returning to step 508, if the next hop is not a trustworthy application or endpoint, the Secure-Media header may be marked insecure at step 524 before routing.

When the entire session establishment has been completed, as may be indicated by the first SIP final response, if the header (also included in the final response) still shows that the call is secure, then each participant (endpoints and sequenced applications) can be assured that the entire SIP signaling chain has been cryptographically secured. However, in some embodiments, if any media stream at any hop is determined to be unsecure, the secure call indicator method for that stream may be terminated and the stream may be marked as insecure.

In all cases, the secure-media indicator method ends at step 540, and may begin again with a next message request at step 320 for a new and/or modified session.

The methods described above are especially effective because the integrity of all the checks are maintained by the session management server which proxies every SIP dialog. Additionally, or alternatively, the session management server may be able to distinguish endpoints from other SIP entities. In one embodiment, the endpoints are distinguished because they may register with a "contact database" as endpoints.

While the above-described flowcharts have been discussed in relation to a particular sequence of events, it should be appreciated that changes to this sequence can occur without materially effecting the operation of the disclosure. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this disclosure can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this disclosure.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present disclosure, systems, apparatuses and methods for determining and indicating security associated with a communication session. While this disclosure has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

What is claimed is:

1. A secure call indicator method, comprising:
   receiving, by a microprocessor, a Session Initiation Protocol ("SIP") message, wherein the SIP message corresponds to a communication session between at least a first communication device associated with a first user and second communication device associated with a second user;
   applying, by the microprocessor, a security check to the received SIP message, wherein the security check is for checking trust of a leg of a communication session, wherein the security check inspects each leg of the communication session to determine that each leg of the communication session has passed the security check, and wherein the communication session has a plurality of legs;
   determining, by the microprocessor, based on the security check, a security classification associated with the communication session; and
   controlling, by the microprocessor, a secure call indicator on one of the second communication device associated with the second user or the at least one first communication device associated with the first user, wherein the secure call indicator indicates the security classification associated with the communication session, and wherein the security classification indicates to the one of the first or second user whether the communication session is secure or unsecure.

2. The method of claim 1, wherein the security check is applied by one of a Back-to-Back User Agent ("B2BUA") or a proxy, and wherein the one of the B2BUA or the proxy comprises rules used for inspection of the received SIP message.

3. The method of claim 1, wherein the secure call indicator outputs a first state when the security check indicates that the communication session is secure.

4. The method of claim 1, wherein applying the security check to the received SIP message further comprises:
   determining, by the microprocessor, one of an Internet protocol ("IP") address or an identification of one or more endpoints;
   determining, by the microprocessor, an identification of a communication server managing the communication session; and
   comparing, by the microprocessor, the identification of the communication server with at least one trusted communication server identification.

5. The method of claim 4, wherein the identification of the communication server managing the communication session is determined from one of a hostname, IP address, and a certificate associated with the communication server.

6. The method of claim 4, wherein applying the security check to the received SIP message further comprises:
   applying, by the microprocessor, a first security check to the received SIP message, wherein the first security check inspects the signaling link security protocol of the communication session comprising:
   determining, by the microprocessor, whether the communication session signaling is end-to-end secure when at least one transport security protocol is used for all signaling links of the communication session.

7. The method of claim 6, wherein the communication session signaling is determined as secure when Transport Layer Security ("TLS") is used by all SIP entities involved in the communication session.

8. The method of claim 7, wherein the use of TLS is determined by inspecting a Request-Uniform Resource Identifier ("Request-URI") of the received SIP message for a Secure SIP ("SIPS") transmission scheme.

9. The method of claim 8, wherein a security header is written to a tamper-protected header of the received SIP message indicating that the communication session is secure.

10. The method of claim 6, wherein applying the security check to the received SIP message further comprises:
    applying, by the microprocessor, a second security check to the received SIP message, wherein the second security check inspects a secure-media header of the received SIP message, wherein the secure-media header cryptographically protects information of one or more Endpoint-View ("EPV") header, Session Description Protocol ("SDP") body, and current partial results of a secure-media marking, comprising:
    determining, by the microprocessor, a media stream security associated with at least one media stream of the received SIP message, wherein the at least one media stream is directed to a terminal IP address; and
    determining, by the microprocessor, that the destination IP address matches the terminal IP address of the at least one media stream.

11. The method of claim 10, wherein the media stream security is provided by a secure protocol.

12. The method of claim 10, wherein the secure protocol is one of Secure Real-time Transport Protocol ("SRTP"), TLS, or Datagram Transport Layer Security (DTLS).

13. The method of claim 10, wherein the secure call indicator is controlled only when all security checks indicate that the communication session is secure.

14. A computer readable storage device having stored thereon instructions that, when executed by a processor, perform a method comprising:
    receiving a Session Initiation Protocol ("SIP") message, wherein the SIP message corresponds to a communication session between at least a first communication device associated with a first user and second communication device associated with a second user;
    applying a security check to the received SIP message, wherein the security check is for checking trust of a leg of a communication session, wherein the security check inspects each leg of the communication session to determine that each leg of the communication session has passed the security check, and wherein the communication session has a plurality of legs;
    determining, based on the security check, a security classification associated with the communication session; and
    controlling a secure call indicator on one of the second communication device associated with the second user or the at least one first communication device associated with the first user, wherein the secure call indicator indicates the security classification associated with the communication session, and wherein the security classification indicates to one of the first or second user whether the communication session is secure or unsecure.

15. The computer readable storage device of claim 14, wherein applying the security check further comprises:
    determining one of an Internet protocol ("IP") address or an identification of one or more endpoints;
    determining an identification of a communication server managing the communication session; and
    comparing the identification of the communication server with at least one trusted communication server identification.

16. The computer readable storage device of claim 15, wherein applying the security check further comprises:

applying a first security check to the received SIP message, wherein the first security check inspects the signaling link security protocol of the communication session comprising:

determining, whether the communication session signaling is end-to-end secure when at least one transport security protocol is used for all signaling links of the communication session.

17. The computer readable storage device of claim 16, wherein applying the security check further comprises:

applying a second security check to the initial received message, wherein the second security check inspects a secure-media header of the received SIP message, wherein the secure-media header cryptographically protects information of one or more Endpoint-View ("EPV") header, Session Description Protocol ("SDP") body, and current partial results of a secure-media marking, comprising:

determining a media stream security associated with at least one media stream of the received SIP message, wherein the at least one media stream is directed to a terminal IP address; and determining that the destination IP address matches the terminal IP address of the at least one media stream.

18. A system, comprising:

a first communication device associated with a first user;

a second communication device associated with a second user; and a communication server including a secure call indicator mechanism that receives a Session Initiation Protocol ("SIP") message, wherein the SIP message corresponds to a communication session between at least the first communication device and the second communication device;

applies a security check to the received SIP message, wherein the security check is for checking trust of a leg of a communication session, wherein the security check inspects each leg of the communication session to determine that each leg of the communication session has passed the security check, wherein the communication session has a plurality of legs;

determines, based on the security check, a security classification associated with the communication session; and controls a secure call indicator on one of the second communication device associated with the second user or the at least one first communication device associated with the first user, wherein the secure call indicator indicates the security classification associated with the communication session, wherein the security classification indicates to at least one of the first or second user whether the communication session is secure or unsecure.

19. The system of claim 18, wherein the communication server is one of a Back-to-Back User Agent ("B2BUA") or a proxy, and wherein the one of the B2BUA or the proxy comprises rules used for inspection of the received SIP message.

20. The system of claim 18, wherein the secure call indicator comprises one physical component that, upon control, produces one of light output, sound output, or tactile output.

21. The system of claim 18, wherein the secure call indicator provides a description of a security associated with the communication session, wherein the description comprises information about the security check.

* * * * *